United States Patent Office.

A. J. CREEL, OF HOPKINTON, IOWA.

Letters Patent No. 78,068, dated May 19, 1868.

---

IMPROVED LINIMENT.

---

The Schedule referred to in these Letters Patent and making part of the same.

---

TO ALL WHOM IT MAY CONCERN:

Be it known that I, A. J. CREEL, of Hopkinton, in the county of Delaware, and State of Iowa, have invented a new and useful Improvement in Liniment; and I do hereby declare that the following is a full, clear, and exact description thereof, which will enable those skilled in the art to make and use the same.

The object of this invention is to provide a liniment for healing wounds on man and beast, and for curing inflammatory diseases, and for various other aches and ails to which mankind, as well as the brute creation, are subject.

And the invention and discovery consist in the combination of the ingredients hereinafter named, the same, when so combined and mixed, forming a most valuable liniment for use, as above stated.

In carrying out my invention and discovery, I use the following ingredients, viz:

Half a pint of turpentine, half a pint of fish-oil, and one ounce of oil of vitriol.

In preparing the liniment, I first mix the turpentine and the fish-oil together in an iron vessel. I then add the oil of vitriol by pouring it into such mixture gradually.

The ingredients readily combine without any further attention, and the liniment is ready for use.

I claim as new, and desire to secure by Letters Patent—

A liniment, formed of the ingredients and in the proportions substantially as herein described, and for the purposes set forth.

The above specification of my invention signed by me, this 19th day of February, 1868.

A. J. CREEL.

Witnesses:
    JAMES T. WILSON,
    WATSON O. DUBAL.